Dec. 19, 1944.                B. E. SHAW                2,365,649
                     SEALED TRUNNION STRUCTURE
                        Filed June 9, 1942
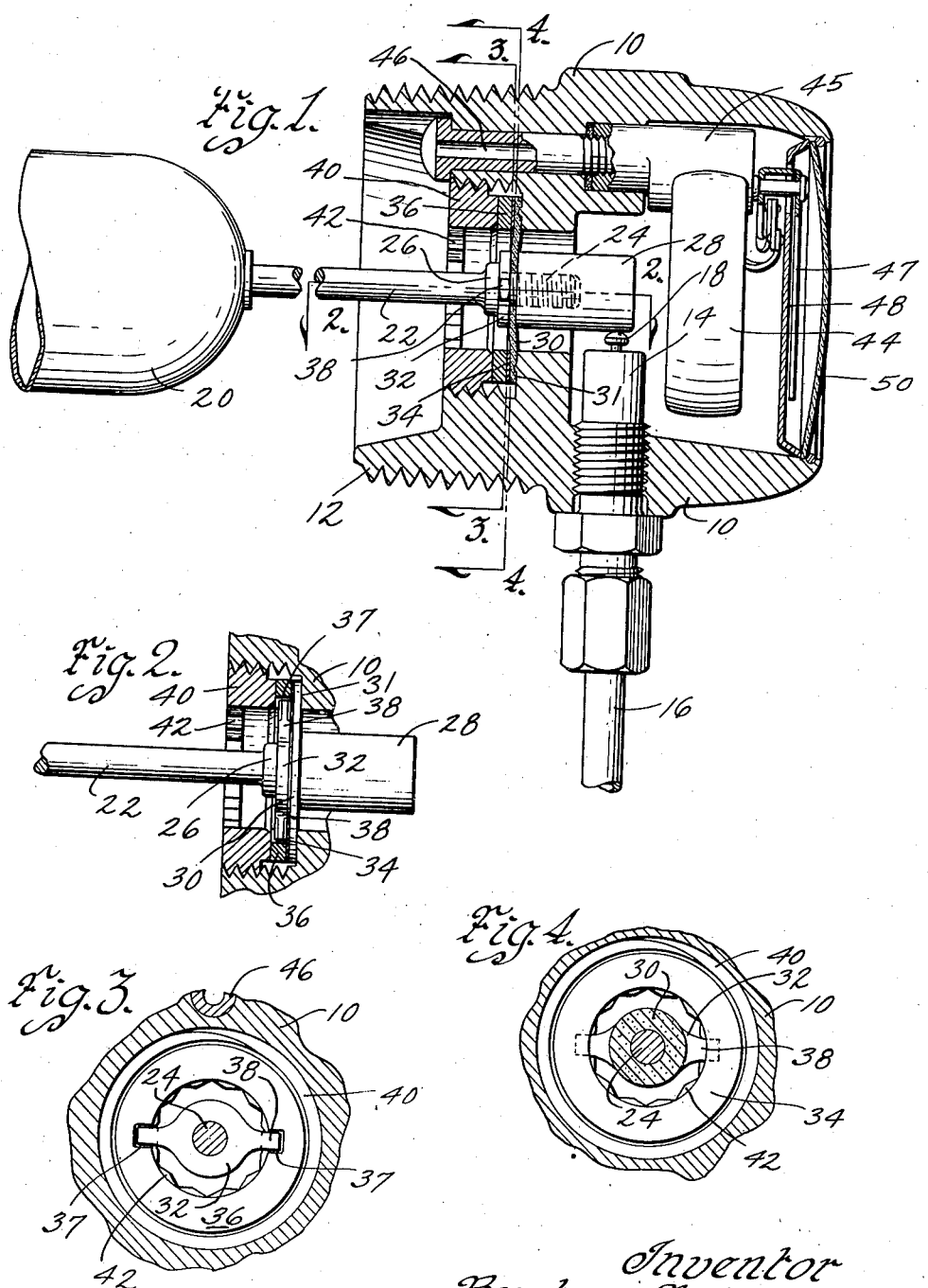
Inventor
Burton E. Shaw
by Bair & Freeman
Attys.

Patented Dec. 19, 1944

2,365,649

UNITED STATES PATENT OFFICE 2,365,649

SEALED TRUNNION STRUCTURE

Burton E. Shaw, Bristol, Ind., assignor to Penn Electric Switch Co., Goshen, Ind., a corporation of Iowa Application June 9, 1942, Serial No. 446,347

2 Claims. (Cl. 286—29)

My present invention relates to a means for pivoting a control rod of an air volume control or the like, the present application being a continuation-in-part of my copending application Serial No. 300,815, filed October 23, 1939, now Patent No. 2,326,574 dated August 10, 1943.

One object of the invention is to provide an improved trunnion arrangement which may be economically manufactured and readily installed, and which eliminates diaphragm breakage such as is sometimes experienced with the form of invention shown in Figure 6 of the parent application.

A further object is to provide a trunnion mounting arrangement for a control rod which involves less expense and difficulty in manufacture than the form thereof shown in Figures 2, 4, 5, 7, 8 and 9 of said parent application, the present invention involving the use of a trunnion washer having notches to receive the trunnions of the trunnion member on the control rod.

Still a further object is to provide a bearing washer so formed and positioned with respect to the other elements of the device that it permits the trunnions of the control rod to rock against a metal surface instead of against the diaphragm itself, which would be made of rubber or the like.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is an enlarged vertical sectional view through an air volume control showing my trunnion bearing arrangement;

Figure 2 is a sectional view on the line 2—2 of Figure 1 and showing the co-action of the trunnions with a trunnion washer and a bearing washer;

Figure 3 is a sectional view on the line 3—3 of Figure 1, showing the notches of a trunnion washer receiving the trunnions; and Figure 4 is a sectional view on the line 4—4 of Figure 1, showing how the trunnions bear against a bearing plate of my device.

On the accompanying drawing I have used the reference numeral 10 to indicate a fitting, such as one of the type shown in my parent application for an air volume control. The fitting 10 is threaded as at 12 for reception in a threaded flange of a pneumatic-water tank or the like.

The air volume control is of the kind designed to permit entry of air into the water pump when air is needed to prevent the water tank from becoming water-logged. Such a valve is shown at 14 and has a pipe or copper tube 16 leading to the water pump in the usual manner. The valve stem of the valve 14 is indicated at 18, and it is controlled as to opening or closing by a float 20 within the tank. The float 20 is mounted on a float rod 22 which, in turn, is threaded as at 24 into an actuator 28. The float rod 22 is provided with a shoulder 26, the purpose of which will hereinafter appear.

Confined between the shoulder 26 and the actuator 28 is a diaphragm 30, of rubber or any suitable flexible material, and a trunnion member 32. The actuator 28, when tightened on the threads 24, compresses the central portion of the diaphragm 30 to form a seal between the diaphragm and the control rod.

The marginal peripheral edge of the diaphragm 30 engages against a shoulder 31 of the fitting 10 and a bearing or thrust washer 34 is placed against the diaphragm. A trunnion washer 36 is then placed against the bearing washer 34, and the diaphragm, bearing washer and trunnion washer are retained in position by a retainer nut 40 threaded into the bore of the fitting 10. The periphery of the diaphragm is thereby sealed relative to the fitting. The retainer nut 40 is provided with a double hexagon socket portion 42 to receive a hexagon wrench.

The trunnion member 32 is in the form of a washer having a pair of oppositely extending trunnions 38. The trunnions 38 are loosely received in the notches 37 of the trunnion washer 36, whereby the notches confine the trunnions to movement in a limited space. The opposite surfaces of the trunnions 38 are slightly curved so that the trunnion member 32 may be placed in position either side out, and the curved surfaces of the trunnions will rock upon the bearing washer 34 instead of being engaged for rocking movement directly against the diaphragm 30.

The air volume control illustrated includes a pressure gauge which forms no part of my present invention, but will be briefly described. A Bourdon tube 44 has one end connected with a fitting 45 to which pressure from the inside of the tank is communicated through a tubular screw 46. The Bourdon tube 44 operates an indicating needle 47, swinging across a dial 48. A lens 50 covers the dial 48.

Practical operation

In the operation of my trunnion bearings the rising and falling of the level of the water in the tank will raise and lower the float 20 for opening or closing the valve respectively. The diaphragm 30 effectively seals the control rod 22 relative to the fitting 10, yet permits free movement thereof. The trunnions 38, during such movement, rock upon the bearing plate 34, which may be of bearing bronze, preferably impregnated with a lubricant such as graphite or the like. The trunnions 38 are thereby sufficiently lubricated for proper and continuous operation, and the diaphragm 30 is protected by the bearing washer against the trunnions 38 pressing into the diaphragm, as caused by the outward pressure against the diaphragm. The water tank, of course, is continuously under a pressure higher than atmosphere, whereas the outside of the diaphragm 30 is subjected to atmospheric pressure and the outward thrust of the trunnions 38 is thereby taken up by the bearing washer 34 and cushioned by the diaphragm 30. The trunnion washer 36 may be separately formed, eliminating the necessity of machining notches into the fitting 10, which would be a rather difficult job. The trunnion washer 36 is much more easily formed as a separate member, and may be easily assembled in position before the retainer nut 40 is screwed into the bore of the fitting 10.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a device of the character disclosed, a fitting having a bore therethrough, a control rod extending through said bore, means for sealing said control rod relative to said fitting comprising a diaphragm, means for sealing the periphery of said diaphragm relative to said fitting and the center of said diaphragm relative to said rod, a trunnion member on said rod having oppositely extending trunnions, a trunnion washer in said fitting and a pair of washers on opposite faces thereof, said trunnion washer having notches extending outwardly from the center hole and from face to face of said washer, said notches receiving said trunnions to confine them to movement in a predetermined space in conjunction with said pair of washers.

2. In a sealed trunnion structure, a fitting having a bore therethrough, an operating rod having a shoulder, an actuator threadedly connected with said rod, a trunnion member and a diaphragm between said shoulder and said actuator, said trunnion member having trunnions, said fitting having a shoulder for the peripheral margin of said diaphragm to engage against, a trunnion washer adjacent said peripheral margin, and a retainer therefor, said trunnion washer having notches outwardly from the bore thereof and completely through said trunnion washer from face to face thereof, said notches receiving said trunnions to confine them, in conjunction with said retainer and said diaphragm, to movement within a predetermined space.

BURTON E. SHAW.